3,340,096
SOLAR CELL ARRAY
Alfred E. Mann, North Hollywood, and Saul Shuster, Northridge, Calif., assignors to Spectrolab, a division of Textron Electronics, Inc., Providence, R.I., a corporation of Delaware
Filed Feb. 26, 1962, Ser. No. 175,720
4 Claims. (Cl. 136—89)

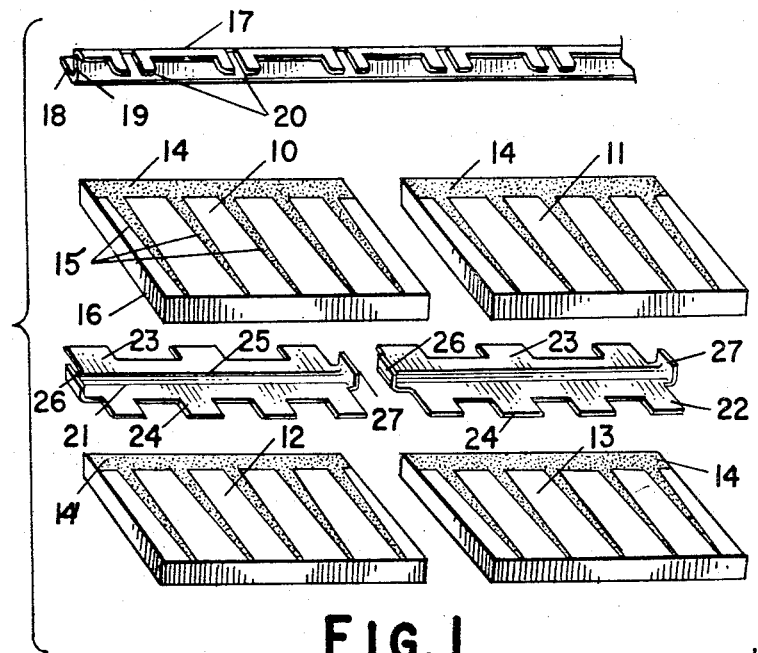
FIG.1.
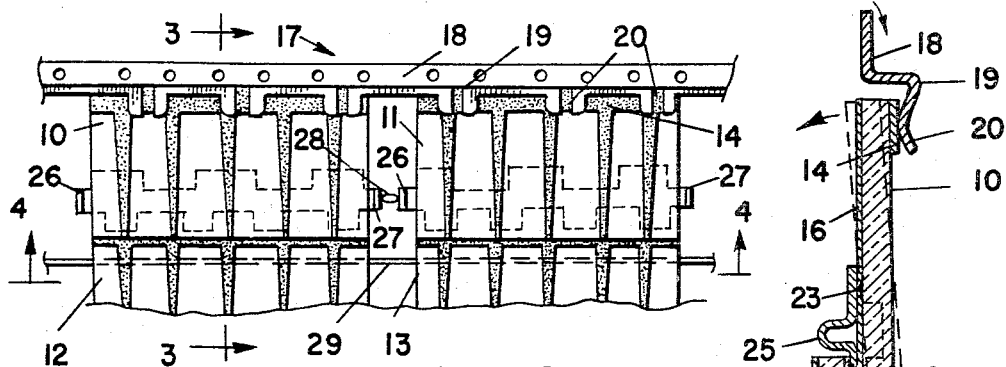
FIG.2.
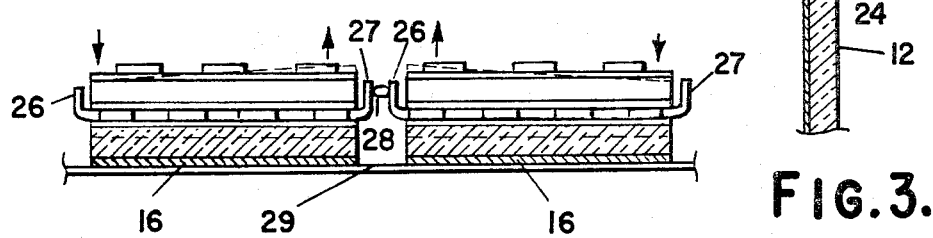
FIG.4.
FIG.3.
INVENTORS
ALFRED E. MANN
SAUL SHUSTER
BY Elliott & Pastoriza
ATTORNEYS United States Patent Office 3,340,096
Patented Sept. 5, 1967

This invention relates generally to solar cell arrays and more particularly to the electrical and mechanical interconnections between the individual cells making up the array.

It is presently common practice to provide an array of solar cells to generate electrical energy from solar radiation for use in earth satellites. Since each cell itself generates only a small amount of power, the required voltage and current is realized by interconnecting the cells in a series and parallel matrix.

Because of space and weight restrictions, particularly in the case of artificial satellites, it is important to design the solar cell array in a manner to expose the maximum areas of each solar cell sensitive surface and yet minimize as much as possible the overall dimensions of the entire array. One such means for maximizing the available sensitive surface is to arrange the cells in a coplanar array. Such a system, for example, is shown and described in co-pending patent application, Ser. No. 126,247, filed July 24, 1961, for Solar Cell System, now Patent No. 3,094,439.

In the foregoing application, a large percentage of the top surface of each solar cell is available for energization from solar energy partly because of a unique electrode configuraiton. The portion of the upper surface of the cell that is covered by electrodes or means for deriving charges therefrom, however, it not useful inasmuch as the generating portion of the cell is eclipsed by the electrodes themselves. It is thus feasible to employ a shingle arrangement wherein each end portion of one cell eclipses a small end portion of an adjacent cell, provided that the eclipsed portion is no greater in extent than the portion that would be covered by an electrode surface in any event.

As a consequence, it has been proposed heretofore to provide cells in end-to-end and side-by-side relationship with the cells in end-to-end relationship overlapping slightly to form a shingled array. Each cell itself is provided with an upper terminal or conducting surface in the form of a thin conducting path adjacent one upper end generally of constant width. The cell in end-to-end relationship thereto has its bottom conducting surface eclipsing or overlapping the top surface of the first cell by an amount equal substantially to the width of the conducting portion so that no solar sensitive upper surface area of the cell is eclipsed. Usually, the overlapping portions are directly soldered together resulting in a rigid construction between end-to-end cells.

With the foregoing construction, many failures have occurred in the overall solar cell arrays. The failures are principally a result of the enormous stresses to which the cells are subject by environmental factors such as extremely low temperatures as occur in outer space. The stresses resulting from thermal expansion and contraction often crack the cells as well as the rigid connections between the cells.

With the foregoing in mind, it is a primary object of this invention to provide a greatly improved solar cell array in which destruction of the cell and of the electrical connections between any of the cells is substantially eliminated to the end that a far more reliable solar cell array is provided.

More particularly, it is an object to provide a novel means for providing mechanical and electrical interconnections between end-to-end and side-by-side cells to effect series and parallel connections, respectively, which connections are flexible to the extent that they will accommodate relative movement of adjacent cells so that thermal expansion and contraction will not result in disconnections.

Still another important object of this invention is to provide novel interconnections between cells in a solar cell array which do not in any way detract from the maximum solar energy receiving areas of the various cells to the end that maximum energy may be derived from an array of minimum size and weight.

Briefly, these and many other objects and advantages of this invention are attained by providing a solar cell array of cells in end-to-end and side-by-side relationship. In the preferred construction, the end-to-end cells are arranged to overlap to provide a shingled effect. In this connection, the upper electrical terminal constitutes a constant width conducting path across one end of the top surface of each cell and this width is overlapped by the under side of the next end-to-end cell so that no active area of the cell is eclipsed but only the electrode portion thereof. However, rather than simply solder one under terminal portion of one cell to the upper terminal conducting path of the next, a novel interconnecting flexible strip is employed.

This interconnecting strip preferably includes extending tabs from its rear and front edges for engaging respectively the under side of one cell and the upper terminal conducting path of the next cell. Similarly, there are preferably provided resilient means for effecting parallel connections between the cells so that each of the cells is resiliently connected to the next cell in such a manner that relative movements may take place therebetween without destroying any of the electrical connections. In other words, the flexibility of the interconnecting strips themselves accommodates thermal expansion and contractions and thus avoids shattering of the cells as resulted from rigid structures heretofore employed.

A better understanding of the invention will be had by referring to preferred embodiments thereof as illustrated in the accompanying drawings, in which:

FIGURE 1 is an exploded perspective view illustrating basic components making up a portion of a solar cell array in accordance with the invention;

FIGURE 2 is a fragmentary plan view of a portion of an array made up of the components illustrated in FIGURE 1;

FIGURE 3 is a fragmentary cross section taken in the direction of the arrows 3—3 of FIGURE 2; and, FIGURE 4 is another fragmentary cross section taken in the direction of the arrows 4—4 of FIGURE 2.

Referring to FIGURE 1, there is shown in exploded view a portion of a solar cell array comprising solar cells 10, 11, 12, and 13. The cells 10 and 11 are normally positioned in side-by-side relationship as are also the cells 12 and 13. When the cells are assembled in the array, the cells 10 and 12 are in end-to-end relationship as are also the cells 11 and 13.

Each of the cells is identical so that description of one will suffice for all. Thus, referring to the cell 10, it will be noted that there is provided an upper terminal in the form of a conducting path 14 preferably, although not necessarily of substantially constant width along the upper end surface of the cell. Connecting to this conducting path are a plurality of conducting paths 15 coated on the surface of the cell 10 and preferably tapering towards a point from the rear end of the cell towards the front end. The solar sensitive surface of the cell constitutes all that upper area except the portion covered by the electrical conducting paths 14 and 15 so that charges are picked up on the tapering path portions 15 and passed to the conducting path 14. The reason for the taper construction is to maintain a substantially constant current density in each of the paths 15 as the current is conducted upwardly along the paths towards the conducting path 14. The bottom of each of the cells in turn is provided with a completely conducting surface as indicated at 16.

At the upper end of the array when in assembled form, there is preferably provided a parallel connecting means in the form of an elongated bus 17. This bus 17 includes a securing portion 18 turning upwardly into a vertical flange 19 and thence horizontally to define a plurality of tabs 20 arranged to electrically connect to the top conducting paths 14 of the various cells in side-by-side relationship.

It will thus be evident that the cells in side-by-side relationship will be connected in parallel with each other. The cells in end-to-end relationship are arranged to be connected in series. Towards this latter end, there are provided novel resilient connecting strips such as indicated at 21 for the cells 10 and 12 and 22 for the cells 11 and 13. Each of these series connecting strips is identical so that description of one will suffice for all. Thus, as shown, the rear and front edges of the resilient strip 21 includes tabs such as indicated at 23 and 24. Between these rear and front edges, the strip is folded into a general U-shape as viewed in cross section and as indicated at 25. This fold provides a "give" or resiliency so that relative motion may take place between the rear and front tabs 23 and 24 without destroying the strip itself and without causing any electrical discontinuity.

In the particular embodiment set forth for illustrative purposes, each of the resilient connectors also includes opposite upwardly bent sides 26 and 27. The arrangement is such that the sides will be in juxtaposed relationship for adjacent series connecting strips employed on side-by-side cells so that by effecting a connection between adjacent sides such as the side 27 of one strip and the side 26 of the next strip, further parallel connections between the cells can be realized.

The foregoing will become clearer by referring to FIGURE 2 wherein there is shown a plan view of the assembled cells 10, 11, 12, and 13. As shown, between the adjacent sides 26 and 27, there is provided a drop of solder 28 connecting the same together. This connection thus effectively connects the under terminal surfaces 16 of the cells together as well as the upper end conducting paths 14 in view of the interconnection between the lower and upper surfaces of end-to-end cells by the tabs 23 and 24, respectively, on the connecting strips.

With reference to the fragmentary cross section of FIGURE 3, the significance of the central fold 25 in the series connecting strips will be evident. Thus, with the tabs 23 soldered to the under side terminal 16 and the tabs 24 in turn soldered to the upper strip portion 14 while the cells are arranged in overlapping or shingled fashion, it will be clear that relative movement of the two cells may take place without breaking the connection, such movement being accommodated by the resilient nature of the fold 25 in the connecting strip. Such movement is indicated in dotted lines in FIGURE 3 wherein it will be noted that the cell 10 has been tilted in the direction of the upper and lower arrows.

The manner in which the top bus strip 17 connects the top row of side-by-side cells in parallel will also be evident from FIGURE 3 wherein it will be noted that the vertical flange 19 extends above the level of the conducting path portion 14 of the cells so that the tab 20 may be resiliently bent downwardly to engage the path 14. With this arrangement, some relative movement between the mounting strip portion 18 and the cell can take place, this movement being accommodated by the flexible flange portion 19 and bent tab 20.

Referring now to FIGURE 4, it will be clear that when the opposite sides of the connecting strips are bent upwardly as described at 26 and 27 and the opposed surfaces connected by a solder drop 28, these sides themselves will permit a certain flexibility between the cells. Such movement is indicated by the arrows and depicted in dotted lines in FIGURE 4.

As an alternative or addition to the bent sides with the solder therebetween, there may be provided a single conductor such as indicated at 29 in the form of a flexible wire. This wire will accommodate relative movement between the cells such as indicated by the dotted lines in FIGURE 4.

In conjunction with the structure illustrated in FIGURES 2 and 4, it should be understood that the spacing between side-by-side cells has been greatly exaggerated merely for purposes of clarity. Actually, the cells will be substantially next to each other with a minimum of space therebetween just sufficient to accommodate the bent sides 26 and 27 if the same are used. In the absence of these sides, the cells may be almost in side-by-side contact with each other and reliance placed on the under elongated conducting wire 29 to effect parallel connections for the various side-by-side cells.

It should also be noted in FIGURE 2 that the amount of overlap of the cells 10 and 11 with respect to the cells 12 and 13 correspond substantially to the width of the top terminal conducting paths 14 so that no active portions of the cells are eclipsed by the overlapped construction. With this arrangement, the overall outside dimensions of the entire array may be minimized and maximum utilization made of the sensitive top surfaces of the various cells.

From the foregoing description, it will be evident that the present invention has provided a greatly improved solar cell array with particular emphasis on the electrical and mechanical interconnections therefor. By means of the flexible series connecting strips as described as well as the various different means for effecting parallel connections between side-by-side cells, the overall reliability of the entire array has been enormously increased.

While only particular embodiments of the invention have been set forth and described, various changes that fall clearly within the scope and spirit of the invention will occur to those skilled in the art. The solar cell array and the interconnections therefor are therefore not to be thought of as limited to the exact embodiments set forth merely for illustrative purposes.

What is claimed is:

1. A solar cell array including, in combination: a plurality of solar cells, arranged in end-to-end overlapping relationship to provide a shingled array, each of said cells including upper terminal means on its upper surface and under terminal means on its under surface, the portion overlapped on the upper surface of any one cell being substantially co-extensive with its upper terminal means so that a maximum of the solar sensitive area of each cell is exposed; and series connectors in the form of resilient conducting strips connecting said cells in series with each other, each of said strips having a width substantially greater than its thickness and including at least a partial fold between its connected portions to accommodate resilient flexing movement whereby said cells are capable of resilient flexing movement relative to each other without any of the series connectons becoming disconnected.

2. A solar cell array comprising, in combination: a plurality of solar cells arranged in end-to-end and side-by-side relationship to provide an array, each of said cells including upper terminal means on its upper surface and under terminal means on its under surface, said upper terminal means comprising a conducting path on one top marginal end of the solar cell, said cells in end-to-end relationship having their adjacent ends overlapping so that a portion of the underside of one cell eclipses the top marginal end of the next cell to provide a shingle arrangement; series connectors in the form of resilient conducting strips connecting said cells in end-to-end positions in series with each other, each of said strips having a width substantially greater than its thickness and including at least a partial fold between its connected portions to accommodate flexing movement; and parallel connections connecting at least some of said cells in side-by-side relationship in parallel with each other, whereby said cells are capable of resilient flexing movement relative to each other without any of the series and parallel connections becoming disconnected.

3. An array according to claim 2, in which said connected portions of each of said series connectors in the form of resilient conducting strip comprising a plurality of tabs extending from rear and front opposite edges electrically engaging respectively the under terminal of one cell and the upper terminal of the next cell, said partial fold comprising a central portion of the strip between said rear and front edges in the form of a general U-shape in cross section to resiliently accommodate relative movement between said cells.

4. An array according to claim 3, in which said resilient conducting strips include upwardly bent opposite sides and means connecting one side of one strip to the adjacent side of the adjacent strip connecting side-by-side cells, whereby parallel connections in addition to those provided by said parallel connectors are effected.

References Cited

UNITED STATES PATENTS

| | | | |
|---|---|---|---|
| 2,938,938 | 5/1960 | Dickson | 136—89 |
| 2,989,575 | 6/1961 | Wallace | 136—89 |
| 3,005,862 | 10/1961 | Escoffery | 136—89 |
| 3,094,439 | 6/1963 | Mann et al. | 139—89 |
| 3,116,171 | 12/1963 | Nielsen et al. | 136—89 |

ALLEN B. CURTIS, *Primary Examiner.*

JOHN H. MACK, WINSTON A. DOUGLAS, *Examiner.*

D. L. WALTON, *Assistant Examiner.*